May 3, 1938. I. SCHEWELOV 2,116,287
SIGN DISPLAY APPARATUS
Filed Sept. 12, 1936 3 Sheets-Sheet 1
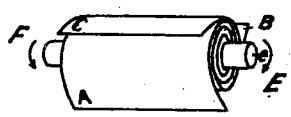
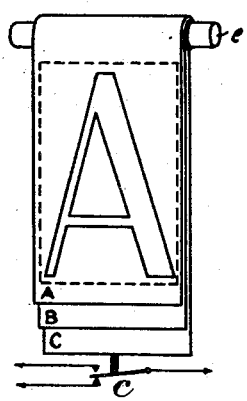
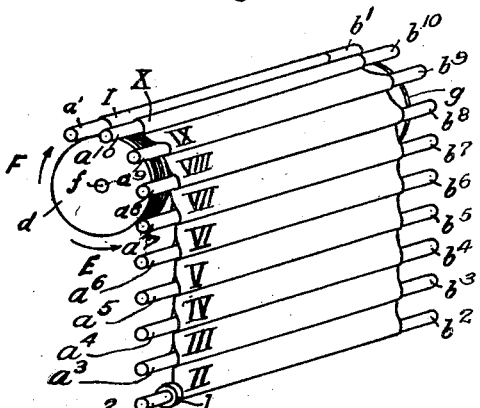
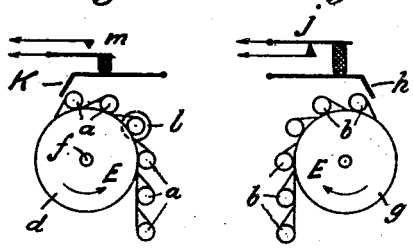
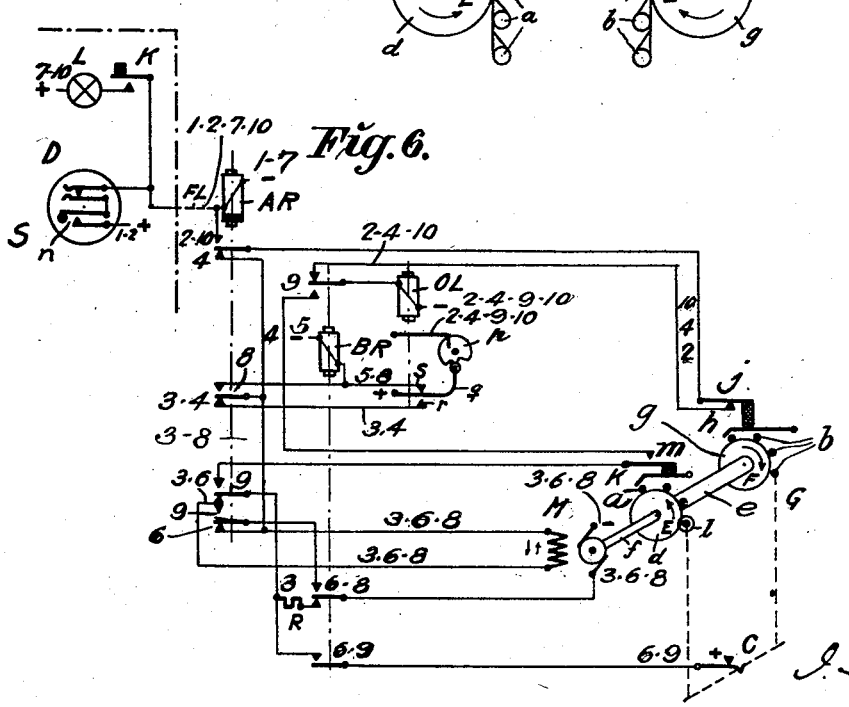
J. Schewelov
INVENTOR
By Glascock Downing & Seebold
Attys.

May 3, 1938. I. SCHEWELOV 2,116,287
SIGN DISPLAY APPARATUS
Filed Sept. 12, 1936 3 Sheets-Sheet 2
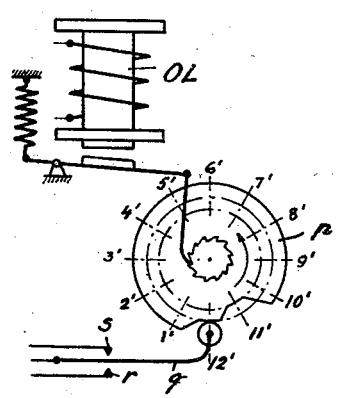
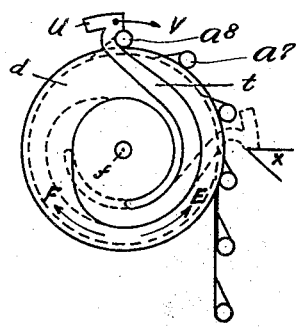
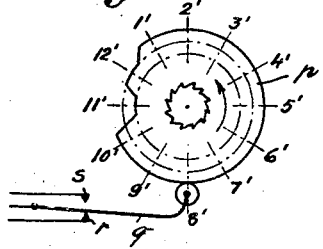
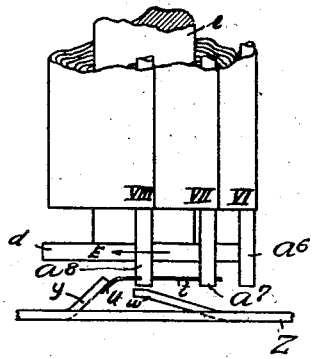
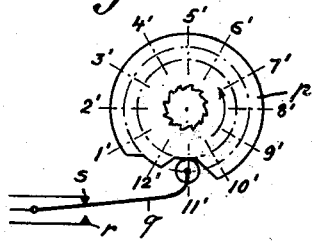

Patented May 3, 1938

2,116,287

UNITED STATES PATENT OFFICE 2,116,287

SIGN DISPLAY APPARATUS

Ilja Schewelov, Stockholm, Sweden, assignor to Telefonaktiebolaget L. M. Ericsson, Stockholm, Sweden Application September 12, 1936, Serial No. 100,555
In Sweden March 5, 1934

13 Claims. (Cl. 40—53)

The invention relates to an apparatus for communicating information by means of leaves which can be brought in their proper turns to a window, a frame or the like so that the information written on the leaf in question becomes exposed to view. Such sign display apparatus can be used for advertising purposes, for displaying election and sports results, for totalizers, etcetera. More particularly the invention relates to an apparatus consisting of a number of leaves arranged about a rotatable and preferably cylindrical shaft, and it is substantially characterized therein that the leaves, which are flexible, are secured in such a manner to the shaft that their mutual positions render possible a turning-over of the leaves or a selection of a desired leaf by rotating the shaft of the sign display apparatus in one direction, while by thereafter rotating the shaft in the other direction the leaves are caused to roll out so that the selected leaf becomes exhibited to the sight.

The invention will be more clearly described with reference to the accompanying drawings, in which Figure 1 is a diagrammatic representation of the sign display apparatus with its cylinder and the flexible sleeves secured thereto.

Figure 2 shows a sign display apparatus in rolled-out condition.

Figure 3 is a more detailed representation of an embodiment of the invention.

Figures 4 and 5 show certain controlling devices for the sign display apparatus.

Figure 6 shows a diagram of the electric circuits required for controlling the sign display apparatus.

Figures 7 to 9 illustrate diagrammatically an auxiliary switch for the signal display apparatus.

Figures 10 and 11 show an auxiliary device for guiding the different leaves in the sign display apparatus.

Figure 12:
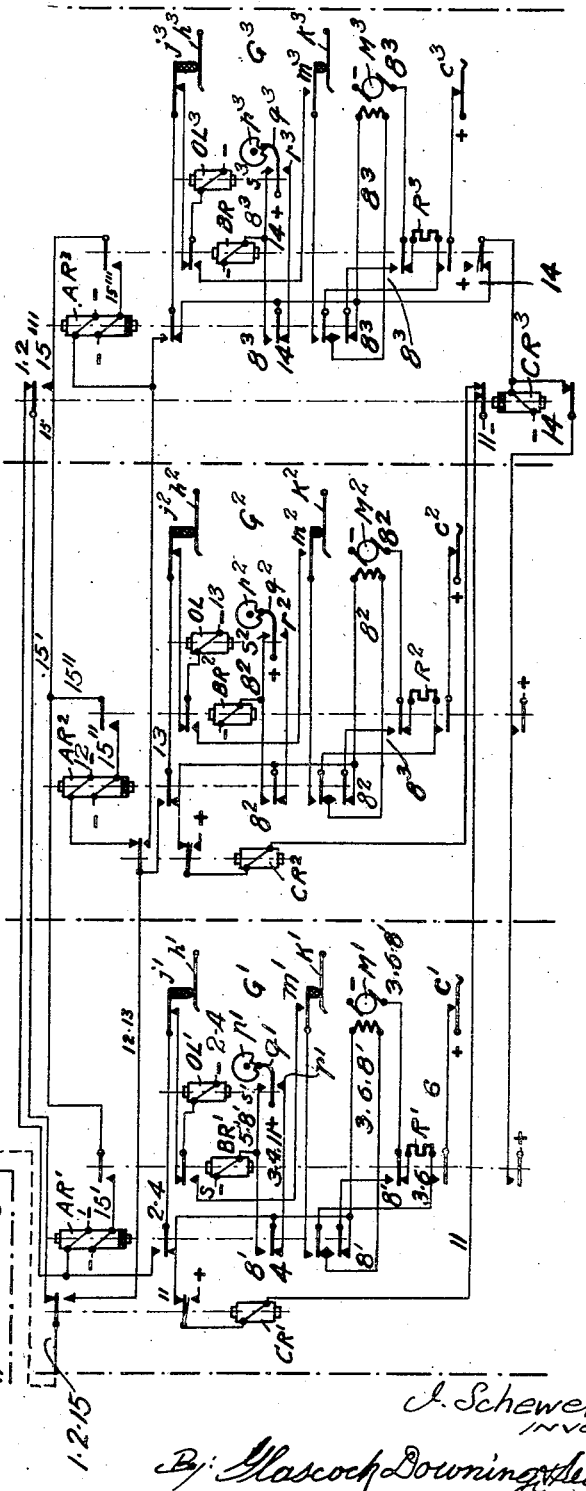
Figure 12 is a circuit diagram for connecting together a plurality of sign display apparatus.

Referring to Figure 1, the sign display apparatus consists of a cylinder $e$ on which are secured a number of leaves A, B, C of flexible material. The securing of each leaf to the cylinder can be made in the same manner as the securing of a window blind to its roller. The different leaves are intended to present information in such a manner that the cylinder $e$ is rolled up from different positions so that, as desired, any one of the leaves A, B, C will be positioned outermost and exposed to view from the direction faced by the sign display apparatus. The selection of the desired leaf is intended to be effected by means of some kind of "turning over" operation. Such a turning over can be effected, for instance, by rotating the cylinder in the direction indicated in Figure 1 by the arrow E. After a certain one of the leaves has been selected the cylinder $e$ is stopped and actuated for rotation in the opposite direction, i. e. in the direction indicated in the Figure by the arrow F. If it is assumed that the leaf provided with the letter A has been selected, the sign display apparatus, upon completed movement in the direction F, will take up the position indicated in Figure 2. If a frame or the like is arranged in front of the leaves only that portion of the leaf A which is positioned within the dotted line will be exposed to view. The leaves B and C, on the other hand, will be entirely covered by the leaf A.

In Figures 3 to 8 is shown an embodiment of the invention comprising ten display leaves I to X. The different leaves are assumed to correspond to the digits 1, 2 . . . 0. Each one of said leaves is at one of its edges fastened to the cylinder, whereas at its opposite edges it is provided with a rod $a$—$b$ of metal or other suitable material, which rod on account of its weight keeps the leaf tensioned. When the leaves are entirely rolled out the lowermost one of the rods will by its weight actuate the bottom contact $c$ (Figure 2) which is intended to be included in circuit with the motor controlling the movements of the sign display apparatus, whereby a limiting of said movement in the direction F is obtained. The different leaves are secured to the cylinder at evenly spaced intervals, so that when the sign display apparatus is rolled up the sides provided with the rods form a corrugated like surface. In said position the uppermost rods rest with their ends $a$ and $b$ on two end disks $d$ and $g$ in such a manner, that the ends $a$ will rest on the end disk $d$ and the ends $b$ on the end disk $g$. Said end disks are rigidly secured to the cylinder $e$ (Figure 2). The cylinder is journalled on a shaft $f$. In moving the cylinder in the direction E all rods $a$—$b$ will thus pass in sequence over the end disks $d$ and $g$. In the present case the sign display apparatus is assumed to be driven by an electric motor. The sign display apparatus must therefore be provided with a controlling device for supervising the movement of the rod. It is then of interest to know, first which rods have passed the uppermost point of the end disks, and second to be able to distinguish among said rods a particular rod, for instance the rod of the leaf positioned nearest to the leaf I. Said supervision is effected by two contact devices which are diagrammatically represented in Figures 4 and 5. When the cylinder of the sign display apparatus is rotated in the direction E (Figure 4), the ends $b$ of the rods $a$—$b$ will, in passing over the lever $h$ of a contact device disposed above the end disk $g$ actuate said lever in such a manner that the lever in turn actuates the contact $j$, whereas the ends $b$ are moved under a contact device having a lever $k$ allotted to the end disk $d$. Said lever $k$ is, however, placed at such height above the end disk that all ends $b$ except the one of the rod $a2$—$d2$ will pass under the lever without actuating the same. The lever in question is, however, provided with a bushing $l$ (Figures 5 and 3) which just about when passing the highest point of the end disk $d$ actuates the lever $k$ whch in turn effects a momentary closing of the contact $m$.

In Figure 6 is shown a circuit diagram for electrically controlling the sign display apparatus. The above mentioned mechanical parts included in the sign display apparatus are provided in said diagram with the same reference characters as in the above described figures. The selection of any one of the leaves of the sign display apparatus, which in the present example means anyone of the digits 1, 2 . . . 0, can be effected by means of some impulse sender known from the automatic telephony. In the present example it is assumed that the setting of the sign display apparatus is effected under control of a dial. In Figure 6 the sending and the restoring apparatus S is shown within a dot-and-dash line. The sending apparatus is connected by means of a line FL with the auxiliary devices of the sign display apparatus. Said devices consist of the relays AR and BR, the auxiliary switch OL, and the motor M. When taking the desired number on the dial, contact $n$ closes a circuit $f$ extending over the line FL and through the relay AR. The relay AR, which is assumed to be a slow-upon release relay, is then actuated and closes a circuit from the dial over the line FL, the working contact of the relay AR, the previously described contact $j$ on the sign display apparatus, and through the magnet of the auxiliary switch OL. Said magnet forms the driving magnet of the stepping mechanism shown in Figures 7 to 9. Said stepping mechanism is provided with a disk $p$ which can be set in twelve different positions $1'$—$12'$. In the position of rest (which is shown in Figures 6 and 7) a circuit shifting spring is held in neutral position. In positions $1'$—$10'$ (Figure 8) the circuit shifting spring $q$ is actuated in such a manner that a contact is established with the fixed contact $r$, whereas in position $11'$ (Figure 9) the circuit shifting contact spring contacts with the spring $s$.

It will now be assumed, that the digit "8" is taken on the dial D. During the following returning movement the dial will effect eight interruptions in the circuit 2, and after the last interruption the contact $n$ will effect one more interruption. Under control of said impulses the driving magnet of the auxiliary switch OL will step the disk $p$ onto position $8'$ (Figure 8), while the slow-acting relay AR, which is maintained in attracted position during the impulse sending, will thereafter become deenergized and closes over a resting contact the circuit 3 for the driving motor of the sign display apparatus. The motor then starts and turns the cylinder of the sign display apparatus in the direction of the arrow E, i. e. in the direction in which the leaves are rolled up.

The speed of the motor is regulated in suitable manner by means of a resistance R included in the starting circuit of the motor.

The order in which the different leaves are normally arranged is shown in Figure 3. When the motor M rotates in the direction of the arrow E the ends $b1$, $b10$ and $b9$ of the rods $a1$—$b1$, $a10$—$b10$ and $a9$—$b9$ will, when passing the lever $h$, three times effect interruption in circuit 4 by means of contact $j$. The above mentioned rods then drop at the remote side of the cylinder $e$. On account of the interruption in the circuit 4, the auxiliary switch OL will advance the disk $p$ three more steps to position $11'$ (Figure 9). In said position the circuit 3 for the driving motor M of the sign display apparatus is interrupted, causing the motor to stop. At the same time a circuit 5 for the relay BR is closed. Said relay is energized and closes the circuit 6 for the motor M, which is now started in its opposite direction and turns the cylinder of the sign display apparatus in the direction of the arrow F, so that the display leaves thereof will be rolled out. Since during the first movement in the direction of the arrow E, the rods of the leaves I, X and IX drop down on the rear side of the cylinder, the leaf VIII will now be positioned outermost and cover the other leaves. The visible communication will therefore be the digit "8", which was also transmitted from the dial.

In order to insure the rolling out of the leaf 8 together with the cylinder $d$—$e$—$g$, there are arranged on the end disks special S-shaped flat springs $t$ which are illustrated in Figures 10 and 11. The first one of said figures is a side view viewed in the direction towards the disk $d$, and Figure 11 is a horizontal view of one end of the sign display apparatus. Similar parts are arranged at the opposite end of the display leaf cylinder. The flat spring $t$ is actuated by means of a spiral spring, not shown on the drawings, in such a manner, that it strives to turn about the shaft $f$ in the direction of the arrow $d$. When the leaves are rolled out, the spring $t$ will therefore take up the position shown in Figure 10 with dotted lines, because the spring will then rest against an abutment $x$. When the leaves are rolled up the end $a$ of the first rod $a$—$b$ will take along the spring $t$ in the direction of the arrow E until the rod has reached a position somewhat above the highest point of the end disk $d$. In said position a part $u$ of the spring $t$ will engage a projecting portion $y$ of the frame-work $z$ of the sign display apparatus (not shown in Figure 10). During the continued movement of the sign display leaf cylinder in the direction E, the spring $t$ is brought out of engagement with the end $a$ of the rod $a$—$b$, whereafter the rod is permitted to drop down at the opposite side of the sign display cylinder. In this manner the leaf appertaining to the rod will come to lie behind all other leaves. The frame-work of the sign display apparatus is also provided with a suitable projection $w$ which is intended to fix the position of the rod $a$—$b$ at the moment when it shall be released from the springs $t$. Since in this manner also the spring $t$ has become released from engagement with the above mentioned rod, the first mentioned one will move in the direction of the arrow $v$ under the action of the spiral spring previously referred to. The spring $t$ will then also be released from its engagement with the projection $y$ and therefore engages the next rod end, for example $a8$, which it meets on its way. If now the motor starts to roll out the display leaves in the direction of the arrow F the spring $t$ will force the rod end $a8$ to turn together with the sign display cylinder $d$—$e$—$g$ in the same direction, that is in the direction of the arrow F. When the spring $t$ reaches the projection $x$ the leaf VIII will continue its movement downwards on account of the weight of the rod $a8$—$b8$, provided that the motor M continues the movement of the cylinder in the direction of the arrow F. Said rolling-out movement will continue until the rod occupying the lowermost position—in the present case the rod $a9$—$b9$—actuates the bottom contact $c$ by its weight. The motor circuit 6 is then interrupted and the motor stops. For removing a given communication and for restoring the sign display apparatus to its starting position a restoring arrangement is provided in the apparatus S. Said arrangement in this case is assumed to consist of a push-button K which is held depressed until the restoring has been effected. The completing of the restoring operation is signalled by the lighting up of a lamp L in the apparatus S. The lamp as well as the resistances in the windings of the magnets AR and OL are so dimensioned, that the lamp receives sufficient current to light up when it is connected in series with the magnet OL but does not become illuminated when it is connected in series with the relay AR. On the other hand the relay AR is attracted, whereas the magnet of the auxiliary switch OL cannot be actuated when it is connected in series with the lamp. Consequently one obtains, upon depression of the button K the closing of the circuit 7 through the relay AR. Said relay attracts its armature and closes a circuit 8 for the motor M which is started in the direction of the arrow E, i. e. causes the display leaves to be rolled up on the cylinder. The rods $a$—$b$ will now pass under the levers $h$ and $k$. However, the interruptions at the contact $j$ will not in any way actuate the operating circuits for the sign display apparatus, because said circuits are interrupted at the upper contact of the relay BR which is attracted. On the other hand, the lever $k$ is actuated, and causes at the contact $a$ closing of the circuit 9, but only when the rod $a2$—$b2$ provided with a bushing $l$ passes under the lever $k$. When the circuit 9 is closed, the magnet of the auxiliary switch OL is energized advancing the disk $p$ from the position 11' (Figure 9) to the position of rest which is shown in Figures 6 and 7. In consequence the motor circuit 8 is interrupted and the motor stops. Also the relay BR is deenergized, because circuit 5 is not closed any longer. In consequence the circuit 10 is closed, the resistance of said circuit being such that the lamp L in the apparatus F is illuminated, thereby indicating that the sign display apparatus has been restored to its position of rest and can be taken in use, since the rod $a2$—$d2$ and its appertaining leaf I will drop, i. e. the sign display apparatus will occupy the starting position shown in Figure 3.

In Figure 12 is shown a diagram of connections according to which a plurality of sign display apparatus can be interconnected so as to be supervisable from a common sending apparatus S'. Said apparatus is provided in the same manner as the apparatus shown in Figure 6 with a dial D'. The signal lamp RL is illuminated during the restoring of the leaves, and the lamp goes out only when all sign display apparatus have been restored and are thus prepared to receive a new digit. The push-button K', however, must not be maintained in depressed condition during the entire restoring period, as was the case in connection with the arrangement shown in Figure 6. The push button is actuated through a single momentary depression, when all the sign display apparatus G1, G2, G3 shown in Figure 12 are to be restored. In setting said sign display apparatus there are sent from the dial in sequence the digits corresponding to the desired settings of the different sign display apparatus. If each leaf in the various sign display apparatus is assumed to correspond to a certain digit, the sign display apparatus, if placed together side by side, will indicate a number having three digits. As in the embodiment according to Figure 6 there is required in the arrangement according to Figure 12 only one line FL for controlling the sign display apparatus, the necessary current feed lines from the battery being then, of course, not reckoned. In Figure 12 both the device corresponding to the previously described relays AR, BR, and the auxiliary switch OL, as well as the other arrangements have been designated with the same reference characters as in Figure 6, except that they have been differentiated through indices. In Figure 12 are shown a number of relays CR. Said relays are required for extending the line FL from one sign display apparatus to the next as soon as the impulse train intended for the first apparatus has been sent and the next impulse train is to be sent. The circuits 1 to 4 are the same as those described with reference to Figure 6. The relay AR', however, closes, after it has been deenergized upon receipt of the first impulse train, a circuit 11 through a relay CR'. Said relay is energized and connects the line FL to the relay AR'. As will be seen from the drawings all relays AR are provided with double windings. The upper winding serves to repeat the impulses, whereas the lower winding is intended for restoring purposes. In addition relay CR' prepares in advance an impulse circuit through the magnet of the auxiliary switch OL2. As a consequence the next impulse train which is sent from the dial G' will pass through the circuits 12 and 13, the relay AR2, and the auxiliary switch OL2, said circuits corresponding to the circuits 1 and 2 through the relay AR1 and the auxiliary switch OL1. After the relay CR1 has attracted its armature, it is held in said position over its lowermost working contact until the relay CR3 interrupts said holding circuit, when the last digit has been sent, and the restoring signal can be expected.

After the auxiliary switch OL1 has received, over the circuit 4, the complement impulses up to 11 reckoned from the first digit sent, the disk $p1$ is shifted to its position 11'. In said position the circuit 3 extending to the driving motor M1 of the first sign display apparatus is interrupted, whereas the circuit 5 through the relay BR1 remains closed. The motor M1 will thereafter drive the sign display apparatus G1, so that the leaves of the same are rolled out, the desired leaf then becoming positioned in front of the other leaves in the same manner as described in connection with Figure 6. The leaf in question thus becomes visible to the spectator.

In the same manner the sign display apparatus G2 and thereafter G3, is set.

After the third impulse train has been sent and the armature of the relay AR3 thereafter brought into inoperative position, the circuit 14 is closed through the relay CR3. Said relay attracts its armature and interrupts the holding circuits for the relays CR1 and CR2. Said relays are deenergized, thereby preparing the actuating circuit 15—15'—15" for the restoring push-button K1. When the push-button in question is operated, said restoring circuit through the relay SR is closed in series with the restoring windings of each one of the relays AR1, AR2 and AR3. The relay SR connects the signalling lamp RL in circuit, said lamp then indicating that the different sign display apparatus are being restored. The relays AR1, AR2 and AR3 respectively close the circuits 8', 8" and 8'" respectively through the motors M1, M2 and M3 respectively, which thus simultaneously start rolling up the leaves of the sign display apparatus G1, G2, G3. The relay CR3 remains in attracted position as long as anyone of the relays BR1, BR2, BR3 is in attracted position, that means so long as the circuit 5 is interrupted. The interruption in the circuit 5 is effected when the corresponding auxiliary switch OL is restored to position 12 (Figure 7), that means after the auxiliary switch in question has received an impulse from the contact m under control of the lever k actuated by the bushing L, since such an impulse constitutes the criterion, that the sign display apparatus in question has been restored to its starting position. When the last one of the relays BR1, BR2, BR3 is deenergized, the circuit 15—15'—15" is initially interrupted. The relay CR3 is, however, slow upon release and will therefore remain in attracted position for some time after the last one of the relays BR has been deenergized in order to make the interruption in the circuit 15 of sufficient duration to give the relay SR in the apparatus S' time to become deenergized and to interrupt the circuit through the signalling lamp SN.

It should be understood that also other combinations than those described above fall within the scope of the invention as defined in the appended claims.

I claim:—

1. In a sign display apparatus, a rotatable shaft, a number of exhibition leaves flexibly attached at one end to the surface of the shaft and adapted to be wound in overlapped relation thereon with their rear faces turned against the shaft, means adapted to first uniformly rotate the shaft in one direction so as to turn over the leaves and select the desired leaf while exposing the overlapped parts of the front faces of the leaves, and means adapted thereupon to turn the shaft in the other direction so as to roll out the leaves and make the front side of the selected leaf visible.

2. In a sign display apparatus, a rotatable shaft, a number of exhibition leaves flexibly attached at one end to the surface of the shaft and adapted to be wound in overlapped relation thereon with their rear faces turned against the shaft, means adapted to first uniformly rotate the shaft in one direction so as to turn over the leaves and select the desired leaf while exposing the overlapped parts of the front faces of the leaves in, means adapted thereupon to turn the shaft in the other direction so as to roll out the leaves and make the front side of the selected leaf visible, controlling devices for each leaf arranged at the ends of the leaves opposite to the ends secured to the shaft, a frame work supporting the rotating shaft controlling devices arranged at the said frame and adapted to cooperate with the controlling devices of the leaves in order to supervise the turning of the leaves.

3. A sign display apparatus according to claim 2, in which the leaves of the sign display apparatus are arranged in such a manner when the latter is in its starting position that by counting from above a number of leaves corresponding to the complement digit up to the total number of leaves plus 1 of the ordinary number of the desired leaf one will find the desired leaf.

4. A sign display apparatus according to claim 2, in which the leaf intended to indicate the starting position of the sign display apparatus is provided with a controlling device which is arranged at the edge of the leaf opposite to the edge secured in the leaf supporting shaft, and which is intended to cooperate with a controlling device secured in the frame-work for supervising the restoring of the leaves to the starting position.

5. A sign display apparatus according to claim 2, in which the controlling devices are made in the shape of rods which at the same time serve to tension the leaves through their weight.

6. A sign display apparatus according to claim 2, with controlling devices in the shape of rods in which the shaft is provided with two end walls of a diameter greater than the diameter of the cylinder which end walls are intended to hold the ends of the rods against electrical controlling contact devices.

7. In a sign display apparatus, a rotatable shaft, a number of exhibition leaves flexibly attached at one end to the surface of the shaft and adapted to be wound in overlapped relation thereon with their rear faces turned against the shaft, means adapted to first uniformly rotate the shaft in one direction so as to turn over the leaves and select the desired leaf while exposing the overlapped parts of the front faces of the leaves, means adapted thereupon to turn the shaft in the other direction so as to roll out the leaves and make the front side of the selected leaf visible, controlling devices for each leaf arranged at the ends of the leaves opposite to the ends secured to the shaft, a frame-work supporting the rotating shaft, controlling devices arranged on said frame and adapted to cooperate with the controlling devices of the leaves in order to supervise the turning of the leaves, an electrical operating circuit cooperating with the said controlling devices and adapted to supervise a reversible electric driving motor.

8. A sign display apparatus according to claim 7, in which the operating circuits control the reversible electric driving motor through shifting the connections of the field exciting circuit of the motor.

9. In a sign display apparatus, a rotatable shaft, a number of exhibition leaves flexibly attached at one end to the surface of the shaft and adapted to be wound in overlapped relation thereon with their rear faces turned against the shaft, means adapted to first uniformly rotate the shaft in one direction so as to turn over the leaves and select the desired leaf while exposing the overlapped parts of the front faces of the leaves, means adapted thereupon to turn the shaft in the other direction so as to roll out the leaves and make the front side of the selected leaf visible, controlling devices for each leaf arranged at the ends of the leaves opposite to the ends secured to the shaft, a frame-work supporting the rotating shaft controlling devices arranged on said frame and adapted to cooperate with the controlling devices of the leaves in order to supervise the turning of the leaves, an electrical operating circuit cooperating with the said controlling devices and adapted to supervise a reversible electric driving motor, an electrical impulse receiver cooperating with said electrical operating circuit, and a supervising apparatus adapted to send impulses to said impulse receiver.

10. In a sign display apparatus, a rotatable shaft, a number of exhibition leaves flexibly attached at one end to the surface of the shaft and adapted to be wound in overlapped relation thereon with their rear faces turned against the shaft, means adapted to first uniformly rotate the shaft in one direction so as to turn over the leaves and select the desired leaf while exposing the overlapped parts of the front faces of the leaves, means adapted thereupon to turn the shaft in the other direction so as to roll out the leaves and make the front side of the selected leaf visible, controlling devices for each leaf arranged at the ends of the leaves opposite to the ends secured to the shaft, a frame-work supporting the rotating shaft controlling devices arranged on said frame and adapted to cooperate with the controlling devices of the leaves in order to supervise the turning of the leaves, an electrical operating circuit cooperating with the said controlling devices and adapted to supervise a reversible electric driving motor, an electrical step-by-step driven impulse receiver cooperating with the said electrical operating circuit and a supervising apparatus adapted to send impulses to said impulse receiver, a number of contact positions in said step-by-step driven receiver in which the same can be set through impulses from the supervising apparatus, a further position in which it can be set from any one of the first mentioned positions by means of impulses from the device controlling the turning over of the leaves, a controlling disk at said impulse receiver, and a switch adapted to be shifted by means of the said controlling disk to three alternative current positions.

11. In a sign display apparatus, a rotatable shaft, a number of exhibition leaves flexibly attached at one end to the surface of the shaft and adapted to be wound in overlapped relation thereon with their rear faces turned against the shaft, means adapted to first uniformly rotate the shaft in one direction so as to turn over the leaves and select the desired leaf while exposing the overlapped parts of the front faces of the leaves, means adapted thereupon to turn the shaft in the other direction so as to roll out the leaves and make the front side of the selected leaf visible, controlling devices for each leaf arranged at the ends of the leaves opposite to the ends secured to the shaft, a frame-work supporting the rotating shaft controlling devices arranged on said frame and adapted to cooperate with the controlling devices of the leaves in order to supervise the turning of the leaves, an electrical operating circuit cooperating with the said controlling devices and adapted to supervise a reversible electric driving motor, an electrical step-by-step driven impulse receiver cooperating with said electrical operating circuit and a supervising apparatus adapted to send impulses to said impulse receiver, a number of contact positions in said step-by-step driven receiver in which the same can be set through impulses from the supervising apparatus, a further position in which it can be set from any one of the first mentioned positions by means of impulses from the device controlling the turning over of the leaves, a controlling disk at said impulse receiver and a switch adapted to be shifted by means of the said controlling disk to three alternative current positions, a supervisory relay which is adapted to close the driving circuit of the motor when the impulse sending from the supervising apparatus is completed.

12. A sign display apparatus according to claim 10, in which there is allotted to the impulse receiving apparatus an interrupting relay which is adapted upon actuation first to interrupt the supervising circuit of the device controlling the turning over of the leaves and to close the supervising circuit for the device controlling the starting position, second to reverse the direction of current in the motor in order to start the rolling-out movement, and third to connect the bottom contact into the driving circuit of the motor in order to effect an interruption in the motor-driving circuit when the leaves of the sign display apparatus have been sufficiently rolled out.

13. A sign display apparatus according to claim 11, in which there is allotted to the impulse receiving apparatus an interrupting relay which is adapted upon actuation first to interrupt the supervising circuit of the device controlling the turning-over of the leaves and to close the supervising circuit for the device controlling the starting position, second to reverse the direction of current in the motor in order to start the rolling-out movement, and third to connect the bottom contact into the driving circuit of the motor in order to effect an interruption in the motor-driving circuit when the leaves of the sign display apparatus have been sufficiently rolled out.

ILJA SCHEWELOV.